(No Model.) 2 Sheets—Sheet 1.

J. H. CANAVAN.
WATER JACKET FOR FURNACES.

No. 277,989. Patented May 22, 1883.

Witnesses:
Geo. H. Strong.
J. H. Tourse.

Inventor,
John H. Canavan
By Dewey & Co.
Attorneys (No Model.)

J. H. CANAVAN.

WATER JACKET FOR FURNACES.

No. 277,989. Patented May 22, 1883.

Witnesses,
Geo. H. Strong
J. H. Strouse

Inventor,
John H. Canavan
By Dewey & Co.
Attorneys

UNITED STATES PATENT OFFICE.

JOHN H. CANAVAN, OF GLOBE, ARIZONA TERRITORY.

WATER-JACKET FOR FURNACES.

SPECIFICATION forming part of Letters Patent No. 277,989, dated May 22, 1883.

Application filed March 19, 1883. (No model.)

*To all whom it may concern:*

Be it known that I, JOHN H. CANAVAN, of Globe City, county of Gila, Territory of Arizona, have invented an Improved Water-Jacket for Furnaces; and I hereby declare the following to be a full, clear, and exact description thereof.

My invention relates to certain improvements in furnaces for smelting-furnaces; and it consists of a combined air-and-water jacket surrounding the furnace, as will be more fully explained by reference to the accompanying drawings, in which—

Figure 1:
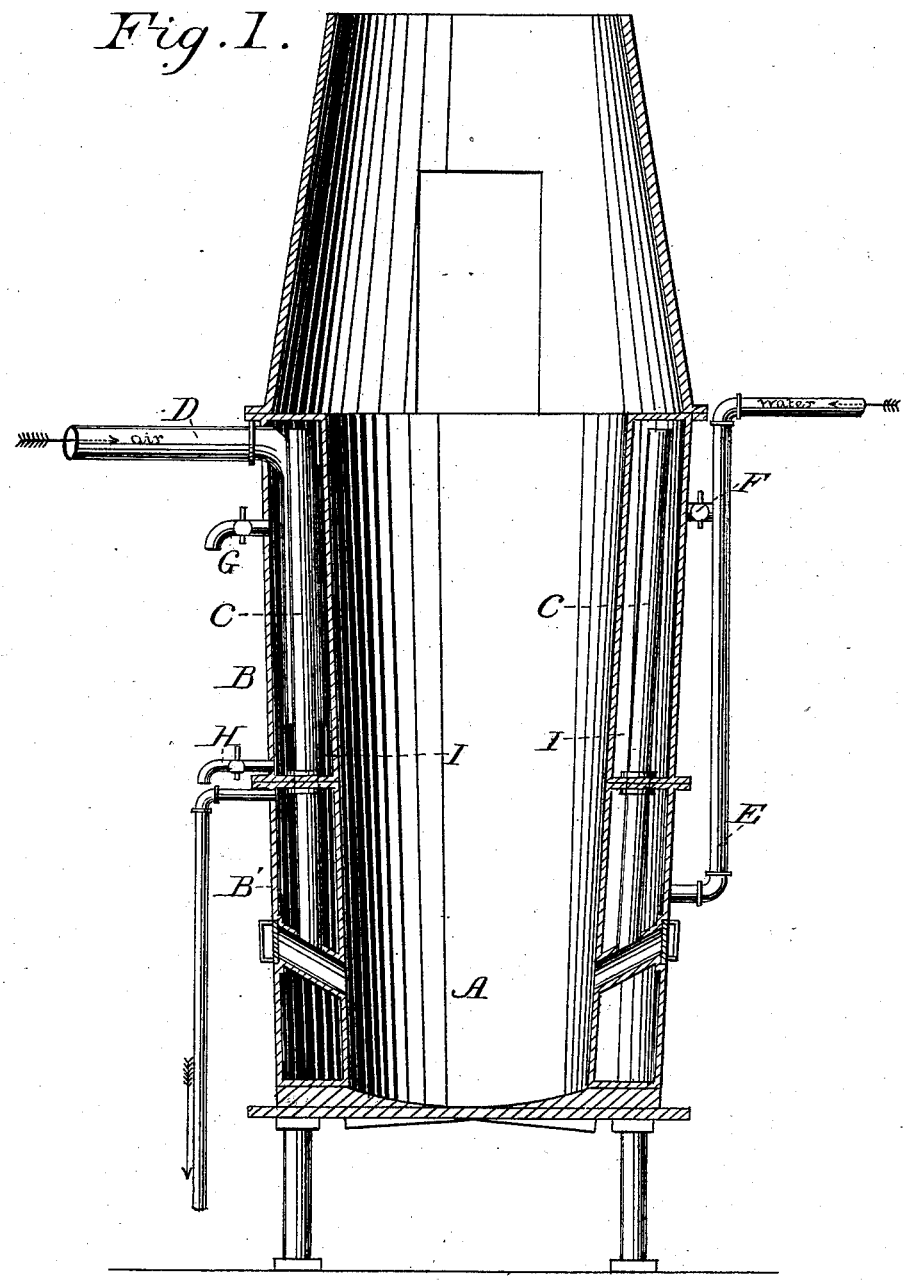
Figure 2:
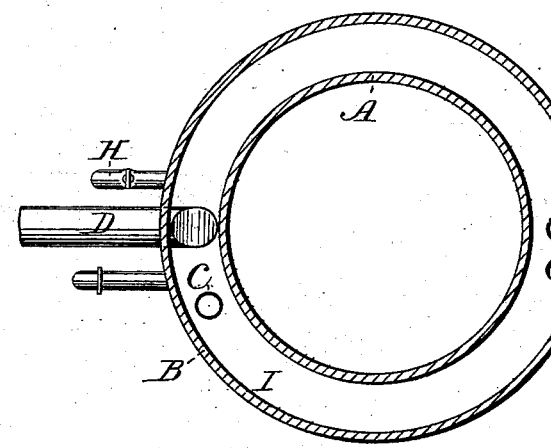
Figure 3:
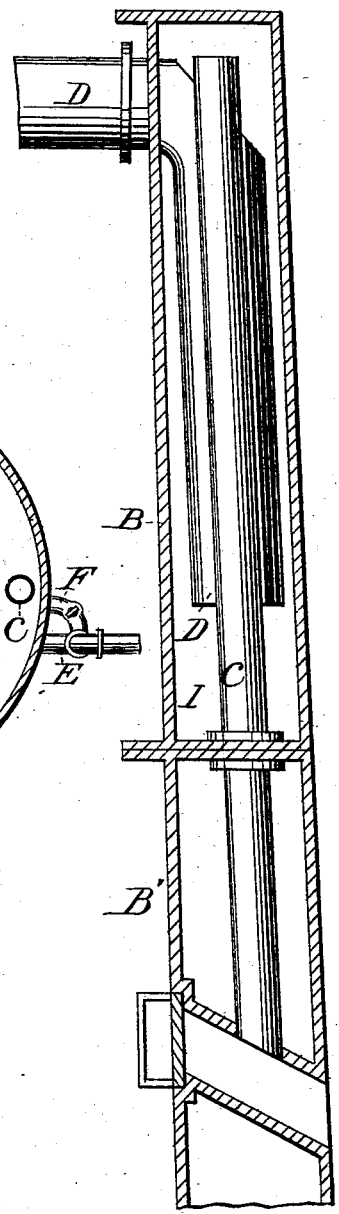

Figure 1 is a vertical section, showing the furnace with its jacket, air and water pipes, and tuyeres. Fig. 2, Sheet 2, is a plan of the air-chamber. Fig. 3 is an enlarged vertical section, showing tuyere-pipe C and pipe D.

A is the body of my furnace, having a stack and feed-door, as shown.

B B' is the jacket which surrounds the furnace. For convenience, the upper half, B, of the furnace may be made of cast-iron, with the tuyere-pipes C cast on the inside, and it may be bolted to the lower part. This jacket is intended to be used both for water and for air, the water occupying the lower part, B', and the air, which is to be employed as a blast, being introduced into the upper part above the surface of the water through a blast-pipe, D. This pipe enters near the top of the exterior casing of the jacket, and, being bent sharply downward between the walls of the jacket, extends nearly to the bottom of the air-space B. The pipes C, connecting with the tuyeres, extend up to near the top of the jacket, so that the air which is discharged from the lower end of the pipe D must rise between the walls of the tuyere, where it is heated before it enters the tuyere-pipes, and a hot blast is thus produced to be discharged into the furnace. This current of air at the same time prevents the walls of the furnace at the upper part from becoming too much heated, while the water protects the lower part.

When the furnace is to be worked water is admitted by an inlet-pipe, E, into the water-chamber in the lower part of the jacket, and is also admitted into the air-space through a cock, F, so as to rise to the level of the cock G, through which any surplus may be allowed to overflow. This water in the air-space remains as long as the air-blast is not used and protects the upper part of the furnace from too great heat. When the air-blast is to be admitted the cock H at the bottom of the air-space is opened and the water allowed to run out. The air from the blast apparatus is admitted through the pipe D and is discharged close to the bottom of the air-space of the jacket, whence it rises to near the top and is heated by its contact with the wall of the furnace before entering the tuyere-pipes C. These pipes convey it down to the tuyeres, through which it is discharged into the lower part of the furnace. The water in the lower part and the blast of air passing through the upper part keep the walls of the furnace sufficiently cool without the necessity of keeping the whole jacket full of water. Whenever the blast of air is shut off water may be again admitted to the air-space. I is the overflow-pipe for the water-jacket B'.

By this construction I am enabled to keep the walls of the furnace sufficiently cool by the use of much less water, and the furnace can be run with at least twenty per cent. less fuel.

This furnace may be used for copper, lead, or other ores, and will work very low grade ores economically.

Having thus described my invention, what I claim as new, and desire to secure by Letters Patent, is—

1. In a furnace, the inclosing-jacket having the chambers B B' for air and water, respectively, in combination with the blast-pipe D, opening into the lower part of the air-space, and the pipe C, leading from its upper part to the tuyeres, substantially as herein described.

2. In combination with the water-jacket B', the water-inlet pipe E, and the tuyeres, as shown, the superposed air space or jacket B, with the blast-pipe D, the tuyere-pipes C, and the water pipes and cocks F, G, and H, substantially as herein described.

In witness whereof I hereunto set my hand.

JOHN H. CANAVAN.

Witnesses:
F. A. NUPTON,
FRANK LIVERMORE.